(12) United States Patent
Reisch et al.

(10) Patent No.: US 8,826,759 B2
(45) Date of Patent: Sep. 9, 2014

(54) ACTUATING APPARATUS FOR ACTUATING AT LEAST ONE SHIFT APPARATUS AND METHOD FOR THE ASSEMBLY AND DISASSEMBLY THEREOF

(75) Inventors: Matthias Reisch, Ravensburg (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 182 days.

(21) Appl. No.: 12/921,431

(22) PCT Filed: Feb. 20, 2009

(86) PCT No.: PCT/EP2009/052013
§ 371 (c)(1),
(2), (4) Date: Sep. 8, 2010

(87) PCT Pub. No.: WO2009/112343
PCT Pub. Date: Sep. 17, 2009

(65) Prior Publication Data
US 2011/0079101 A1    Apr. 7, 2011

(30) Foreign Application Priority Data
Mar. 13, 2008   (DE) .......................... 10 2008 000 638

(51) Int. Cl.
*F16H 59/00*      (2006.01)
*F16C 33/80*      (2006.01)
(52) U.S. Cl.
CPC ..................................... *F16C 33/80* (2013.01)
USPC ............................................. 74/335; 74/337
(58) Field of Classification Search
USPC .......... 74/335, 89.23, 337.5, 371, 372, 473.5, 74/473.36, 483 R
See application file for complete search history.

(56) References Cited

U.S. PATENT DOCUMENTS

| | | | | |
|---|---|---|---|---|
| 4,395,240 A | * | 7/1983 | Blanchard | 440/86 |
| 4,510,816 A | * | 4/1985 | Linden | 74/372 |
| 4,713,979 A | * | 12/1987 | Muto et al. | 74/337.5 |
| 5,214,974 A | * | 6/1993 | Morbidelli | 74/371 |
| 5,809,836 A | * | 9/1998 | Patzold et al. | 74/337.5 |
| 5,863,270 A | * | 1/1999 | Chen et al. | 475/289 |

(Continued)

FOREIGN PATENT DOCUMENTS

| | | |
|---|---|---|
| DE | 43 25 964 A1 | 1/1995 |
| DE | 102 06 584 A1 | 9/2003 |
| DE | 103 02 502 A1 | 9/2004 |
| DE | 10 2006 049 274 A1 | 4/2008 |

*Primary Examiner* — Troy Chambers
*Assistant Examiner* — Zakaria Elahmadi
(74) *Attorney, Agent, or Firm* — Davis & Bujold, PLLC; Michael J. Bujold

(57) ABSTRACT

An actuating apparatus for actuating a shifting mechanism in a transmission to shift a gear wheel on a hollow shaft with an actuator module that is at least partially positioned within the hollow shaft and which comprises an actuator which can be connected with a coupling element of the shift mechanism which radially, inwardly extends into the inner diameter of the hollow shaft. The enclosure of the actuator module has at least an axially extending assembly passageway which guides the coupling element, during axial insertion of the actuator module into the hollow shaft. A method for the assembly and disassembly of an actuator module, with at least one actuator of an actuating apparatus for inside actuation of a shift mechanism on the hollow shaft. The actuator module is axially inserted into the hollow shaft and rotated via an assembly guide.

12 Claims, 4 Drawing Sheets

(56) References Cited

U.S. PATENT DOCUMENTS

| | | | |
|---|---|---|---|
| 5,868,035 A * | 2/1999 | Devaud | 74/337.5 |
| 6,044,719 A * | 4/2000 | Reed et al. | 74/330 |
| 6,327,927 B1 * | 12/2001 | Rogg et al. | 74/335 |
| 6,367,342 B1 * | 4/2002 | Weismann et al. | 74/335 |
| 6,517,254 B1 * | 2/2003 | Hata et al. | 385/69 |
| 6,729,200 B2 * | 5/2004 | Paetzold | 74/473.25 |
| 6,898,992 B2 * | 5/2005 | Koenig et al. | 74/335 |
| 6,993,991 B2 * | 2/2006 | Baasch et al. | 74/355 |
| 7,093,511 B2 * | 8/2006 | Norum et al. | 74/335 |
| 7,197,954 B2 * | 4/2007 | Baldascini et al. | 74/331 |
| 7,305,900 B2 * | 12/2007 | Suzuki et al. | 74/340 |
| 7,363,834 B2 * | 4/2008 | Kapp et al. | 74/337.5 |
| 7,426,880 B2 * | 9/2008 | Caenazzo et al. | 74/330 |
| 7,520,209 B2 * | 4/2009 | Lorenzoni et al. | 92/31 |
| 7,823,473 B2 * | 11/2010 | Uberti et al. | 74/335 |
| 7,841,253 B2 * | 11/2010 | Uberti et al. | 74/335 |
| 7,997,159 B2 * | 8/2011 | Hemphill et al. | 74/339 |
| 8,109,166 B2 * | 2/2012 | Tsukada et al. | 74/330 |
| 8,186,237 B2 * | 5/2012 | Niko et al. | 74/331 |
| 8,316,730 B2 * | 11/2012 | Matsumoto | 74/337.5 |
| 8,327,729 B2 * | 12/2012 | Matsumoto et al. | 74/325 |
| 2004/0244516 A1 * | 12/2004 | Baasch et al. | 74/325 |
| 2005/0241424 A1 * | 11/2005 | Baldascini et al. | 74/331 |
| 2006/0060014 A1 * | 3/2006 | Namgung | 74/89.23 |
| 2006/0096397 A1 * | 5/2006 | Michioka et al. | 74/89 |
| 2006/0107777 A1 * | 5/2006 | Huang | 74/89.23 |
| 2006/0117880 A1 * | 6/2006 | Osterlanger | 74/89.23 |
| 2006/0150761 A1 * | 7/2006 | Beer et al. | 74/335 |
| 2006/0213298 A1 * | 9/2006 | Tateishi | 74/89.23 |
| 2007/0137331 A1 * | 6/2007 | Kachouh | 74/89.23 |
| 2008/0110284 A1 * | 5/2008 | Pan et al. | 74/89.23 |
| 2008/0168852 A1 * | 7/2008 | Chen et al. | 74/89.23 |
| 2010/0043586 A1 * | 2/2010 | Mohr et al. | 74/473.12 |
| 2010/0192713 A1 * | 8/2010 | Duits et al. | 74/89.23 |
| 2010/0192714 A1 * | 8/2010 | Beneker et al. | 74/89.23 |
| 2010/0269614 A1 * | 10/2010 | Tung | 74/335 |
| 2011/0096808 A1 * | 4/2011 | Hwang et al. | 374/141 |
| 2011/0185831 A1 * | 8/2011 | Kozak | 74/89.44 |
| 2012/0024093 A1 * | 2/2012 | Yamakura | 74/89.23 |
| 2012/0074795 A1 * | 3/2012 | Nishikawa et al. | 310/23 |
| 2012/0103115 A1 * | 5/2012 | Wu et al. | 74/89.23 |
| 2012/0132453 A1 * | 5/2012 | Fu | 173/148 |
| 2012/0144942 A1 * | 6/2012 | Yukitake et al. | 74/335 |

* cited by examiner

ACTUATING APPARATUS FOR ACTUATING AT LEAST ONE SHIFT APPARATUS AND METHOD FOR THE ASSEMBLY AND DISASSEMBLY THEREOF

This application is a National Stage completion of PCT/EP2009/052013 filed Feb. 20, 2009, which claims priority from German patent application serial no. 10 2008 000 638.6 filed Mar. 13, 2008.

FIELD OF THE INVENTION

The present invention concerns an actuating apparatus for actuating at least one shift apparatus of a transmission. Also, the invention concerns a method of the assembly and disassembly of an actuating apparatus.

BACKGROUND OF THE INVENTION

It is known in the art of automotive engineering that shift mechanisms, or shift elements, for instance in countershaft transmissions are radial actuated externally by means of the shift forks or shift levers. For example, transmissions are known from DE 43 25 964 and DE 103 02 502 A1 where the shift mechanisms or shift elements each comprise an axially movable sliding sleeve. The sliding sleeves are hydraulically controlled. For that purpose, appropriate cooling oil supply channels are positioned in the shaft which has the gear wheels to be shifted.

A manual transmission is known from the publication DE 102 06 584 A1 in which the gear wheels to be shifted are provided with inner activation and a matched activating mechanism. Hereby, the inner activation of the shift sleeve takes place via a connecting pin which can be moved axially in slots of the hollow shaft. The connecting pin is activated by a co-rotating hydraulic assembly which is integrated into the hollow shaft. The oil supply unit is hereby positioned outside of the hollow shaft. Therefore, a modular construction, where the complete activating mechanism is positioned inside of the hollow shaft, cannot be realized with the known manual transmission.

Furthermore, a mechanism for the activation of a gearwheel, designed as an idle gear of a countershaft constructed transmission, is known to the applicant through a non-published application DE 10 2006 049 274. The transmission assembly comprises two shift mechanisms, each of which shift two idle gears of a layshaft. The shift mechanisms are activated via two activating mechanisms, from the inner layshaft which is designed as a hollow shaft. The activating mechanisms comprise several actuators which are combined in a module. For the assembly of the module, it is inserted into the hollow shaft and finally attached to the hollow shaft.

SUMMARY OF THE INVENTION

It is the task of this invention to propose an actuating apparatus, as well as a method, for the assembly and disassembly of the earlier described type, which enables especially simple and safe assembly and disassembly of the actuating apparatus.

Thus, an actuating apparatus for the activation of at least one shift mechanism of a transmission to shift at least one gear wheel on a hollow shaft, with at least one actuator module which is at least partially mounted in the hollow shaft, comprises at least one actuator for the inner activation, which can be brought into operational connection with at least one coupling element of the shifting apparatus that extends radially into the inner diameter of the hollow shaft. In accordance with the invention, the actuator module has at least an axial assembly guide, or similar, as a clearance for the respective coupling element during the axial insertion of the actuated module into the hollow shaft.

Thus, to realize an operational connection between the respective actuator and the assigned coupling element of the shifting mechanism, the actuator module of the proposed actuating apparatus can be inserted in a simple way into the hollow shaft, through which the assigned coupling elements are moved along the respective assembly guidance when the activated module is inserted. As long as the coupling elements are not in operational connection with the assigned actuator, the actuator module can be inserted into the hollow shaft. Thus, an assembly concept capable of volume production has been realized through the inventive and proposed actuating apparatus. Thus, and for instance, several linear actuators, including the required electronics and with the inductive rotating transformer, as well as additional accessories, can be combined in the actuator module and can be assembled in one step. Due to the small amount of external interfaces of the actuator module, a high level of quality assurance and an especially low retrofit percentage can be ensured.

It can be provided, in accordance with a possible embodiment variation of the invention, that the assembly guide is particularly designed as a groove, or similar, which runs in the axial direction on the outside of the divided enclosure of the actuated module, and in which each radial coupling element, extending into the inner diameter, can be guided during the insertion of the actuated module. In accordance with the shape of the groove, when the actuator module is axially inserted into the hollow shaft, it is moved by the coupling element which is always form-locking incorporated into the groove which functions as a clearance path.

In accordance with another embodiment of the invention, the actuator module can comprise several, consecutively positioned actuators, each of which comprises a drivable spindle nut with at least an area to accommodate the assigned coupling element of the shift mechanism, whereby the respective areas of accommodation of the spindle nut, and also several areas of accommodation of a spindle nut, can be positioned in an offset to each other in the circumferential direction. In the case that each spindle nut has several areas of accommodation, offset from each other, several grooves, which are offset to each other, are also required the actuator module, and in that case also the same number of coupling elements are provided at each shifting mechanism.

In an offset accommodation area configuration in the circumferential direction for the different spindle nuts, the advantage arises that the associated coupling elements on the hollow shaft are also positioned in an offset. Since the hollow shaft has the corresponding oblong holes, or similar, to realize the axial movement of the coupling elements, also the oblong holes are positioned in an offset across the circumferential area of the hollow shaft which is advantageous in regard to the stiffness of the hollow shaft. Hereby, an even deflection of the shaft, in relationship to the rotation angle of the shaft, is realized.

In accordance with a next embodiment where the accommodation areas are in an offset, it can be provided that the course of the assembly guide, designed as a groove, has a first axial section, followed by a second, helically shaped section or similar, followed by a third, axial section with a transversal branch into a first insert section, followed by a fourth helically shaped section, and followed by a fifth axial section which, for instance, merges into a transversal extending, second insert section.

Preferably, the length and the gradient of the helically shaped sections are calculated, so that the actuator module, when inserting the coupling element along this section, performs a rotation of 90°. This proposed course is matched to an actuator module with two successively positioned actuators, in which the areas of accommodation of the different spindle nuts are positioned in the circumferential area with an offset of 90° to each other. The coupling elements of different shift elements or shift mechanisms each use the same groove when the actuator module is inserted. Also, other courses of the helically shaped sections, or the following sections, are conceivable if, for instance, the accommodation areas of the respective spindle nuts are positioned with respect to each other in a different angle.

Each of the provided insertion sections allows rotation of the actuator module without a move hereby in the axial direction. This is required to realize an operational connection between the respective coupling element and the assigned spindle nut. Preferably, the first insertion section can have a kind of funnel shape and the second insertion section an almost half funnel shape, or similar. For instance, other narrowing shapes can also be used to achieve a better guidance for the coupling elements during the insertion into the assigned accommodation area. In the second insertion section, an axial stop is formed by a kind of funnel shape, because the actuator module has reached in that position its axial final position and just needs to be rotated to achieve an operational connection between the coupling elements and the assigned accommodation areas.

It can be provided, in accordance with an advantageous embodiment variation of the invention that several assembly guides or grooves, positioned offset from each other, are positioned across the circumference of the housing of the actuator module. Preferably, the grooves can be positioned offset from each other by an angle of 180°. It is also possible to provide more grooves which are, for instance, evenly distributed about the circumference, whereby the number of grooves depends on the number of the coupling elements.

In the proposed actuating apparatus, the insertion sections for each assembly guide can each be assigned to a movement area of each spindle nut of the actuators, whereby the movement area is realized by means of a corresponding recess in the enclosure. Thus, the respective coupling element, radially extending into the inside of the hollow shaft, can be brought into operational connection with the accommodation area of the spindle nut.

To disconnect the operational connection of the actuator module, during the disassembly or retrofit, between the coupling elements and the respective spindle nuts, it can be provided that for each movement area of the spindle nut a respective extraction section, opposite of the insertion section, is available for the extraction of the respective coupling element into the neighboring assembly guide, to terminate the operational connection. Preferably, the extraction section which is opposite from the insertion section, is enlarged in regard to its dimensions, to comfortably extract the coupling element from the accommodation area, independent of the axial position of the spindle nut.

The proposed actuation apparatus can preferably be used in a dry dual clutch transmission, with at least one of the layshafts, for the inside actuation of at least one shift mechanism. Also, an application with other automated shift transmissions, maybe in planetary gear transmissions in which activation of the shift mechanism from the inside of the shaft, is conceivable, whereby the shift mechanism can be any from state of the art. For instance, the shift mechanisms can use synchronizations, claws, clutches, or similar. Also other application areas are conceivable.

The basic task in this invention is also solved by a method for the assembly and disassembly of an actuator module with at least one actuator of an actuating apparatus for inner actuation of at least one shift mechanism in a hollow shaft, where the actuator module is inserted, axially along at least one assembly guide into the hollow shaft and thereafter, an operating connection is established, through rotational motion of the actuator module, between the respective coupling element and the assigned accommodation areas of the actuator. Preferably, the proposed method can be applied to the inventive actuating apparatus. However, also other applications are conceivable.

Thus, the inventive method is suitable as a series, repeatable assembly concept, in which an actuator module with several axially consecutively positioned actuators can be installed fast and safely into a hollow shaft, for instance into a layshaft of a double clutch transmission. The actuator module can comprise additional electrical components. For instance, a rotating transformer, power and signal electronics, memory and connection elements such as cable and conductors, or similar, can be integrated into the actuator module. The connection elements, inter alia, can be positioned between the actuator and the hollow shaft in an area in which no longitudinal or assembly guides, respectively, are provided.

BRIEF DESCRIPTION OF THE DRAWINGS

In the following, the invention is further explained based on the drawings. They show.

DETAILED DESCRIPTION OF THE PREFERRED EMBODIMENTS

Figure 1:
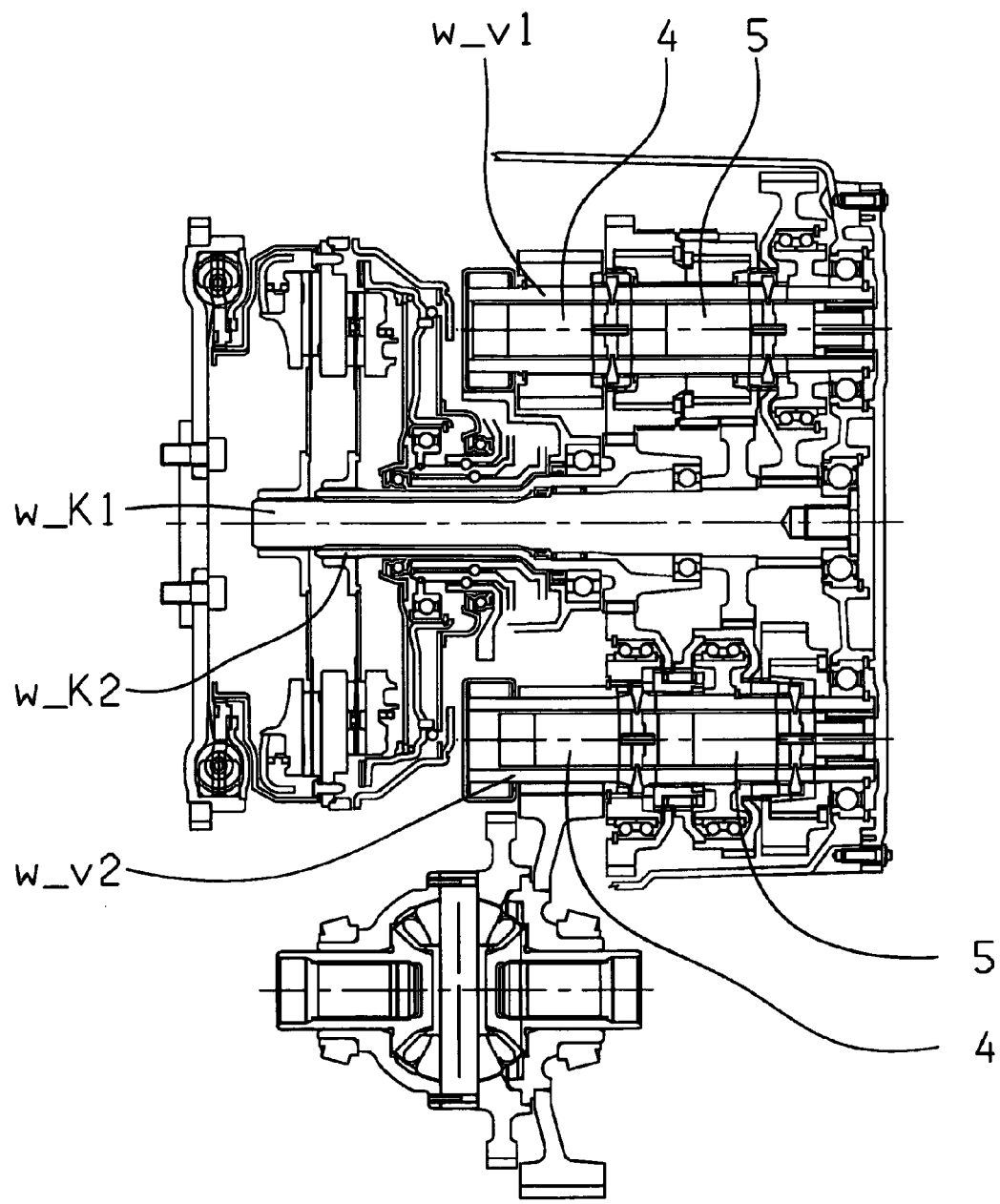
FIG. 1 a cut away view of an exemplary presented double clutch transmission with actuating apparatuses in accordance with the invention.

FIG. 1 presents an exemplary, possible application area for a proposed actuating apparatus, in accordance with the invention, for the actuation of at least one shift mechanism or shift elements of a multi-gear double clutch transmission which is designed as a countershaft transmission and shown in the sectional view.

The double clutch transmission comprises two clutches, with its inputs connected to a drive shaft. Also, a torsion vibration damper is positioned on the drive shaft. The outputs of the clutches are each connected with one of two coaxially positioned transmission input shafts w_K1, w_K2. The first transmission input shaft w_K1 is designed as a solid shaft, and the second transmission input shaft w_K2 is designed as a hollow shaft. In addition, two layshafts w_v1 and w_v2 are provided which are positioned axially parallel to each other.

Several idle gears are positioned on each layshaft w_v1, w_v2 and which mesh with fixed gear wheels on the transmission input shafts w_K1, w_K2.

To shift the idle gears of the respective layshafts w_v1, w_v2, two shift mechanisms are positioned on each of both layshafts w_v1, w_v2 with their respective actuating apparatuses, which are designed as an actuator module 1, positioned inside the layshafts w_v1, w_v2, which are designed as hollow shafts 2, as inner actuation. The actuation apparatuses can displace axial form locking or friction locking shift mechanisms or shift element to connect the respective idle gear with the layshaft w_v1, w_v2. Each of the provided actuation apparatuses, in the form of the actuator module 1, are axially positioned in a rotationally fixed manner in the assigned layshaft w_v1, w_v2, designed as hollow shaft 2.

Figure 2:
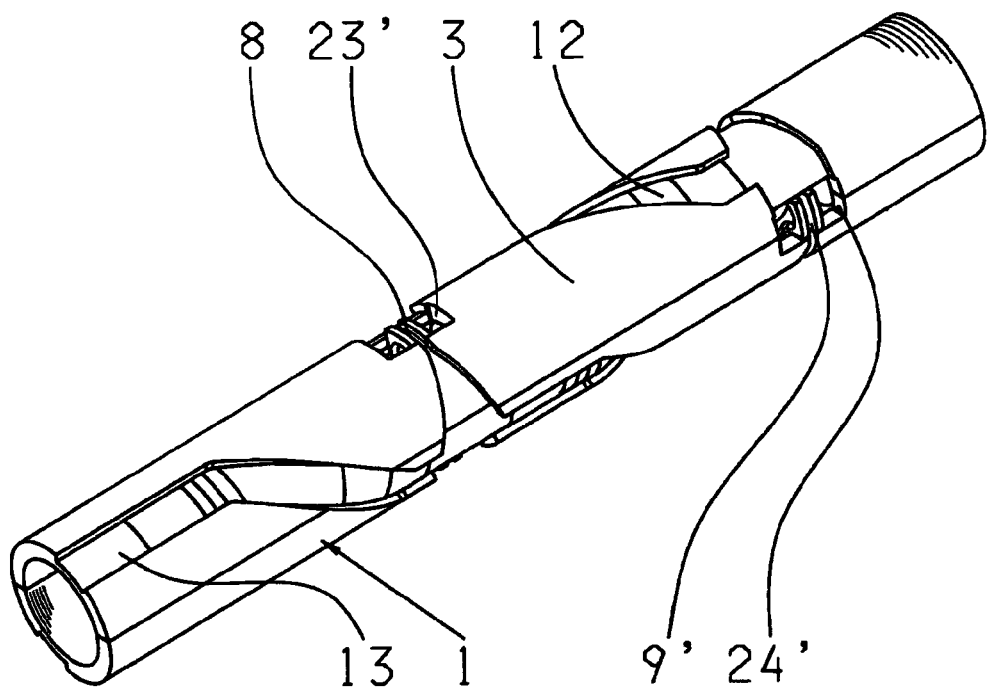
FIG. 2 a three-dimensional view of a possible embodiment variation of an actuator module in accordance with the invention.

FIG. 2 illustrates an enclosure 3 of a complete actuator module 1 with two axially successive actuators 4, 5 each of which drive a rotationally fixed but axially movable spindle nut 6, 7. Each spindle nut 6, 7 comprises two accommodation areas 8, 8', 9, 9' that are positioned offset from each other at an angle of 180°. Each accommodation area 8, 8'; 9, 9' serves to accommodate an assigned coupling element 10; 11, 11' of a shifting mechanism or shifting element which has to be actuated to move the coupling element 10, 11, 11' in the axial direction and which can especially be seen in FIG. 5 and FIG. 6. The respective coupling element 10, 11 is fixed to an assigned sliding sleeve 21, 22 which is to also be axially moved. In the shown embodiment example, each sliding sleeve 21, 22 has two coupling elements 10, 11, 11' that are positioned to be offset from each other by approximately 180°, whereby one coupling element of the sliding sleeve 21 is covered and it is therefore not shown.

It is provided, in accordance with the invention, that the enclosure 3 of the actuator module 1, in this example, has two symmetrical, facing each other, assembly guides as grooves 12, 13 in the axial direction at the circumferential area of the enclosure 3. The grooves 12, 13 serve as clearance for the respective coupling element 10, 11, 11' during the axial insertion of the actuator module 1 into the assigned hollow shaft 2.

Figure 3:
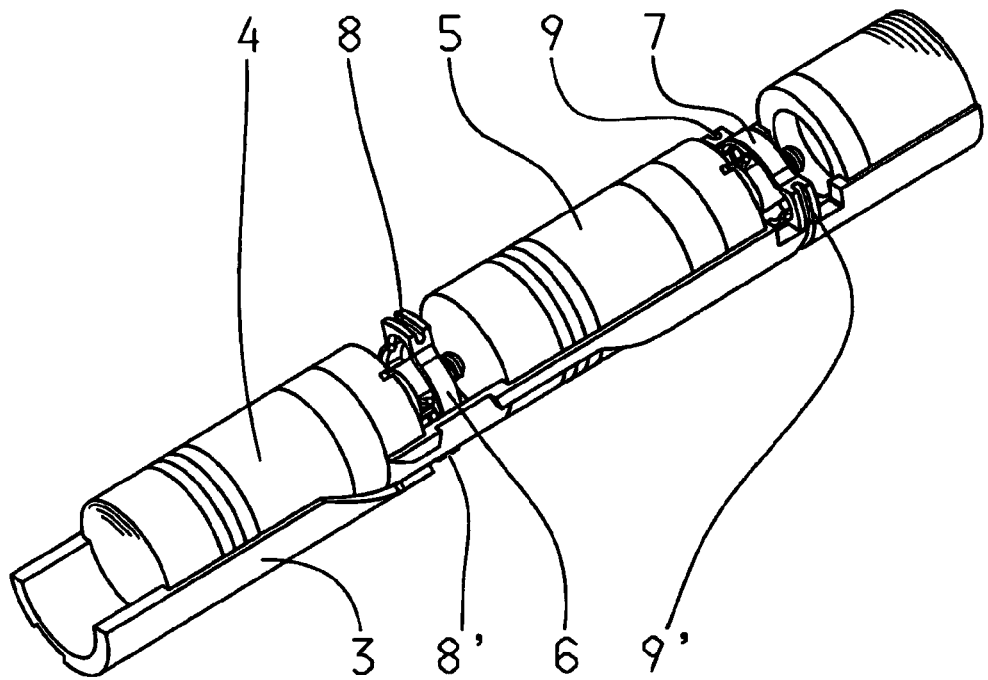
FIG. 3 a three-dimensional view of half of the enclosure of the actuator module in accordance with FIG. 2

It can be especially seen from FIG. 3 that the enclosure 3 of the actuator module 1 is divided, in the axial direction, into two enclosure parts. Thus, the two actuators 4, 5 and additional accessories can be installed in a simplest manner into the actuator module 1.

Figure 4:
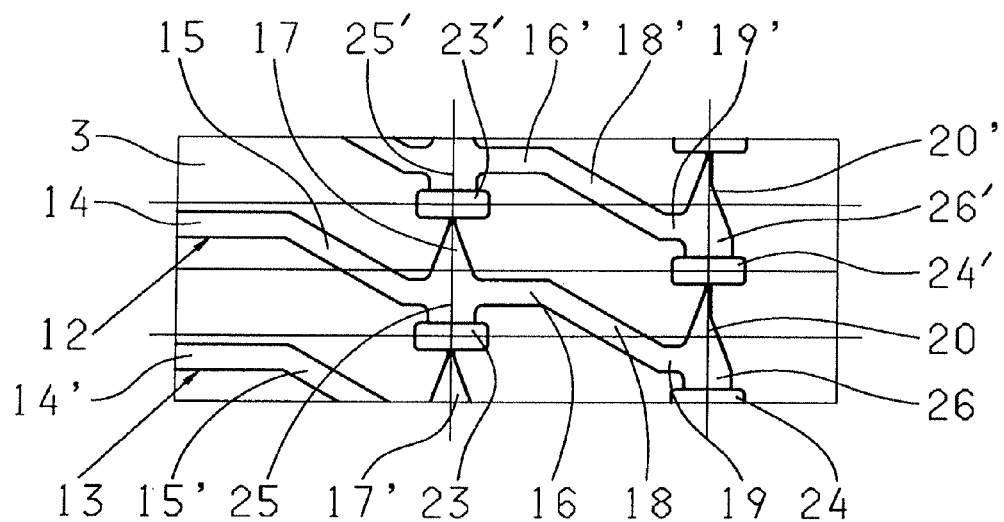
FIG. 4 a view of assembly guides of the actuator module where the groove projects into the plane.

The two grooves 12, 13 which are positioned in the enclosure 3 of the actuator module 1, are shown in FIG. 4 as projecting into the plane of the picture. The resulting course of each groove 12, 13 comprises, in this example, in each case a first axial section 14, 14', followed by a second helically shaped section 15, 15', followed by a third axial section 16, 16' with a transversal branching first insertion section 17, 17', followed by a fourth helically shaped section 18, 18', which is followed by a fifth axial section 19, 19' which merges into a second transversal insertion section 20, 20'.

The first insertion section 17, 17' extends transverse from the third axial section 16, 16' and ends in each case in an assigned area of motion 23, 23' of the assigned spindle nut 6 of the first actuator 4. The respective area of motion 23, 23' is provided as an approximately rectangular shaped recess in the enclosure 3. The side facing away from the respective insertion section 17, 17' each has an extraction section 25, 25' to each of the other groove 12, 13. The style of the first insertion sections 17, 17' is like a funnel shape to guide each assigned coupling element 10. The width of the respective extraction section 25, 25' is larger, compared to the respective insertion sections 17, 17'.

The second insertion sections 20, 20' are positioned at the end of each of the fifth axial sections 19, 19' and transverse thereto and each terminate into an assigned area of motion 24, 24' of the assigned spindle nut 7 of the second actuator 5. The respective area of motion 24, 24' is provided as an approximately rectangular recess in the enclosure 3. On the side, opposite of the respective insertion second 20, 20', a connection to the respective other groove 12, 13 is provided via the assigned extraction sections 26, 26'. This style of the first insertion sections 20, 20' is approximately half funnel shaped to realize a stop for the assigned coupling element 11, 11'. The width of the respective extraction sections 26, 26' is larger in comparison to the respective insertion sections 20, 20'.

Figure 5:
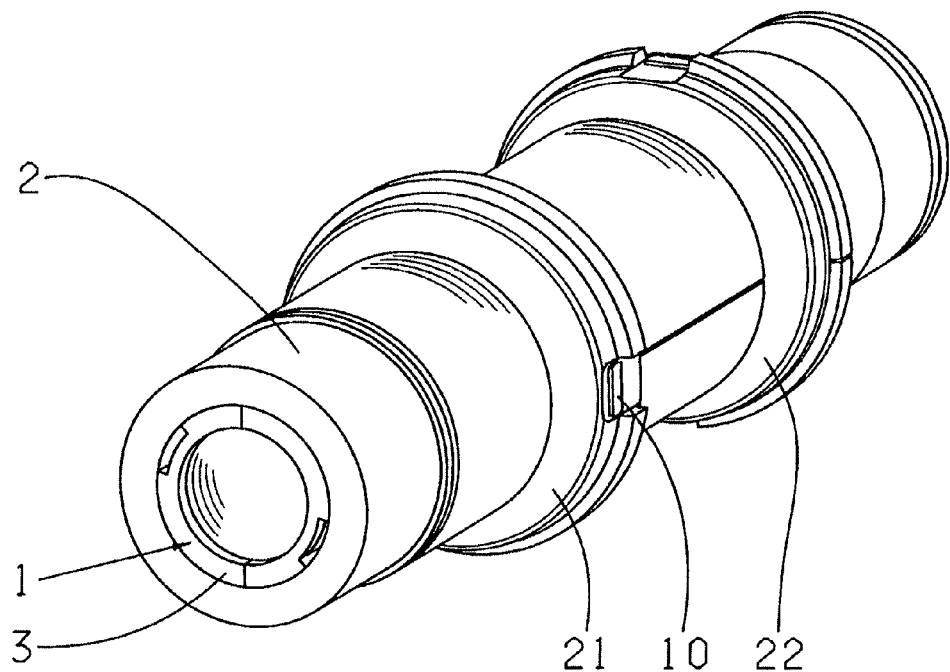
FIG. 5 a three-dimensional view of the actuator module, mounted in the hollow shaft.
Figure 6:
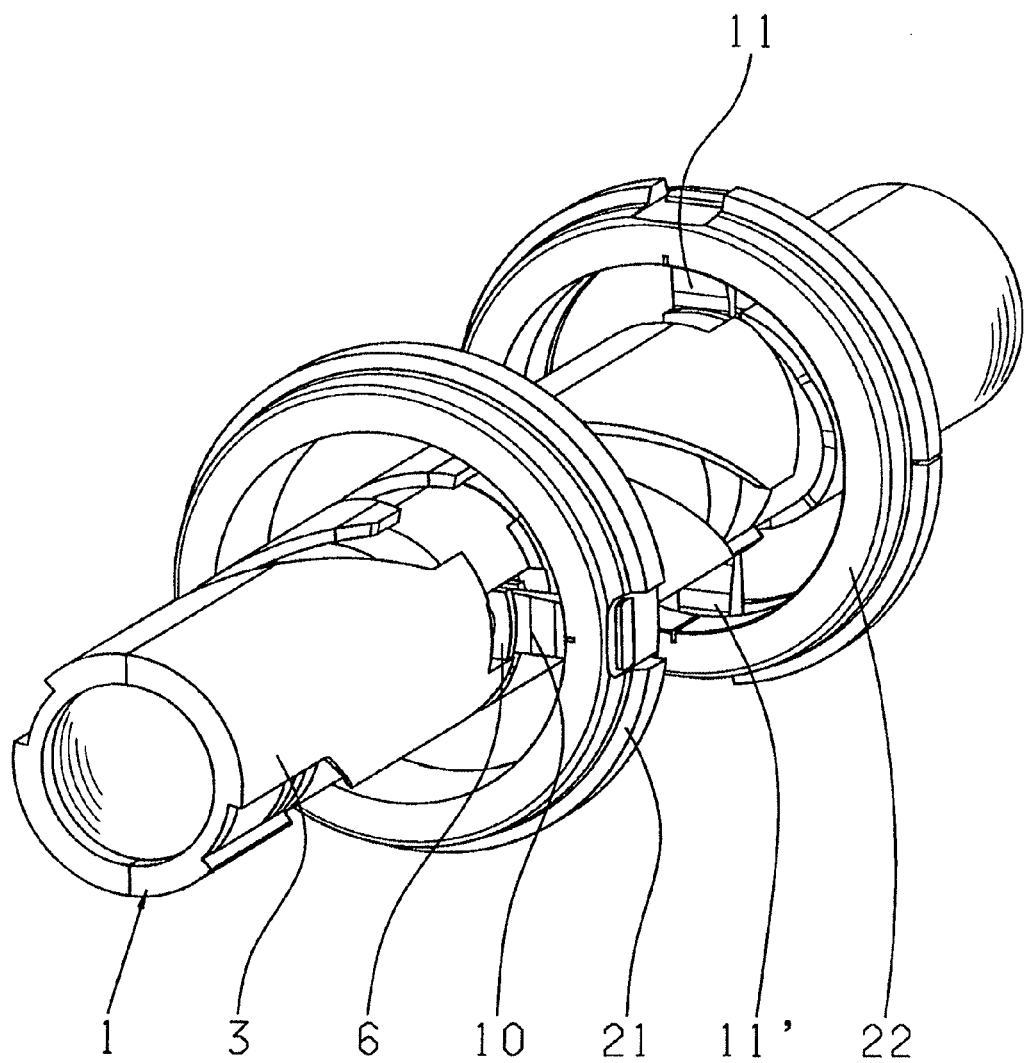
FIG. 6 a three-dimensional view with a hidden hollow shaft, in accordance with FIG. 5.

It can be seen especially in FIG. 5 and FIG. 6 that the sliding sleeve 21, 22 of each shift mechanism has each two coupling elements 10; 11, 11' attached to it, designed as receptacle pins. The coupling elements 10 of the sliding sleeve 21 of the first shift mechanism are each shown in this exemplary embodiment variation as offset positioned in an angle of approximately 90°, each in reference to the circumferential direction of the coupling elements 11, 11' of the sliding sleeve 22 of the second shift mechanism.

The installation of the actuator module 1 of the proposed actuating apparatus can be processed as follows:

First, the enclosure 3 of the actuator module 1 is inserted into the hollow shaft 2 in a way such that the coupling elements 11, 11' are each inserted into one of the grooves 12, 13, that are symmetrically positioned with respect to each other. Thus, the respective coupling element 11, 11' of the sliding sleeve 22 is now guided along the first axial section 14, 14' of the grooves 12, 13 until the respective coupling element 11, 11' reaches the second helically shaped section 15, 15'. Now, besides the axial motion, rotational motion of the enclosure 3 is also required. Due to the length and the gradient of the second helically shaped sections 15, 15', the actuator module 1 is rotated by 90°. Thereafter, the respective coupling element 11,11' of the sliding sleeve 22 in the respective groove 12, 13 each reach the third axial section 16, 16'. At this point in time, also the respective coupling element 10 of the sliding sleeve 21 is inserted into the assigned groove 12, 13 in the area of the first axial section 14, 14'. Thereafter, the actuator module 1 is now axially inserted further into the hollow shaft 2, until the respective coupling elements 10 reach the second helically shaped section 15, 15', or the respective coupling elements 11, 11' reach the fourth helically shaped section 18, 18'. At this time, besides the axial movement, rotation movement of the enclosure 3 is again required. The gradient and the length of the respective fourth helically shaped sections 18, 18' is also selected in a way so that the enclosure 3 is rotated by an angle of 90°. Thereafter, the coupling elements 10 each reach the first insertion section 17, 17' and the coupling elements 11, 11' each reach the second insertion section 20, 20'. To realize the operational connection between the coupling elements 10; 11, 11' of both sliding sleeves 21, 22 and the respective assigned accommodation area 8, 8'; 9, 9' of the spindle nuts 6, 7, the coupling elements 10; 11, 11' are moved along the assigned insertion sections 17, 17'; 20, 20' by rotary motion which is opposite to the previous rotary motion of the actuator module 1, to achieve the form lock with the respective accommodation area 8, 8'; 9, 9' of the spindle nuts 6, 7. Thereafter, the enclosure 3 of the actuator module 1 is fastened axially in a rotationally fixed manner in the hollow shaft 2. The axial fixing can be realized, for instance, by means of a stepped bore, a locking ring, a screw or similar. It is also possible to glue the actuator module to the hollow shaft. Herewith, the assembly is finished.

For the disassembly, the enclosure 3 of the actuator module 1 is further rotated until the form lock connection between the coupling elements 10; 11, 11' and the assigned accommodation areas 8, 8'; 9, 9' of the spindle nuts 6, 7 become disengaged, where the coupling elements 10; 11, 11' are each guided in the neighboring groove 12, 13, along the assigned extraction sections 25; 25', 26; 26'. The extraction sections 25; 25', 26; 26' have a sufficient width to ensure that the respective coupling element 10; 11, 11', independent of the axial position of the respective spindle nut, can be released from the accommodation area. Thereafter, the coupling elements 10; 11, 11' are again guided along the different sections of the grooves 12, 13 by withdrawing the enclosure 3 of the actuator module 1 from the hollow shaft 2 and rotated accordingly.

REFERENCE CHARACTERS

1 Actuator Module
2 Hollow Shaft
3 Enclosure
4 Actuator
5 Actuator
6 Spindle Nut
7 Spindle Nut
8, 8' Accommodation Area
9, 9' Accommodation Area
10 Coupling Element
11, 11' Coupling Element
12 Groove
13 Groove
14, 14' First axial section
15, 15' Second helically shaped section
16, 16' Third axial section
17, 17' First insertion section
18, 18' Fourth helically shaped section
19, 19' Fifth axial section
20, 20' Second insertion section
21 Sliding sleeve
22 Sliding sleeve
23, 23' Range of motion of the spindle nut
24, 24' Range of motion of the spindle nut
w_K1 First transmission input shaft
w_K2 Second transmission input shaft
w_v1 First layshaft
w_v2 Second layshaft
25, 25' Extraction section
26, 26' Extraction section

The invention claimed is:

1. A transmission shift mechanism actuating apparatus for actuating at least one shift mechanism of a transmission for shifting at least one gear wheel on a hollow shaft (2), the transmission shift mechanism actuating apparatus comprising;
a hollow shaft (2);
at least one gear wheel mounted on the hollow shaft;
at least one actuator module (1) at least partially positioned in the hollow shaft (2) and which comprises at least one actuator (4, 5);
the at least one actuator (4, 5)
being at least partially positioned in the hollow shaft (2), and applying an axially directed actuating force on and enabling internal axial actuation of at least one coupling element (10, 11, 11'), and
being operationally connectable with the at least one coupling element (10, 11, 11');
the at least one coupling element (10, 11, 11') extending radially inward to an inner diameter of the hollow shaft (2); and
the actuator module (1) having at least one axial assembly guide as an open passageway for the coupling element (10, 11, 11') when the actuator module (1) is axially inserted into the hollow shaft (2).

2. The actuating apparatus according to claim 1, wherein the assembly guide is a groove (12, 13) which extends in an axial direction on an outer surface of an enclosure (3), in which the coupling element (10, 11, 11'), which extends radially to the inner diameter, is guided when the actuator module (1) is inserted into the hollow shaft (2), the at least one actuator module (1) is rotationally fixed with respect to the hollow shaft (2), and at least part of the at least one actuator (4, 5) is axially movable with relation to the hollow shaft (2).

3. A transmission shift mechanism actuating apparatus for actuating at least one shift mechanism of a transmission for shifting at least one gear wheel on a hollow shaft (2), the transmission shift mechanism actuating apparatus comprising;
a hollow shaft (2);
at least one gear wheel mounted on the hollow shaft;
at least one actuator module (1) at least partially positioned in the hollow shaft (2) and which comprises at least one actuator (4, 5);
the at least one actuator (4, 5) being operationally connectable with at least one coupling element (10, 11, 11') and enabling internal actuation;
the at least one coupling element (10, 11, 11') extending radially inward to an inner diameter of the hollow shaft (2); and
the actuator module (1) having at least one axial assembly guide as an open passageway for the coupling element (10, 11, 11') when the actuator module (1) is axially inserted into the hollow shaft (2);
wherein the actuator module (1) comprises a plurality of actuators (4, 5) that are axially positioned, one after the other, and each of the actuators (4, 5) has a drivable spindle nut (21, 22) with at least one accommodation area (8, 8'; 9, 9') for an assigned coupling element (10; 11, 11') of the shifting mechanism, the accommodation areas (8, 8'; 9, 9') of the different spindle nuts (21, 22) are positioned offset from one another, in reference to a circumferential direction.

4. The actuating apparatus according to claim 2, wherein the passageway of the assembly guide is a groove (12, 13) which has at least a first axial section (14, 14'), followed by at least one second helically shaped section (15, 15'), followed by at least one third axial section (16, 16') with a transversely extending first insertion section (17, 17'), followed by a fourth helically shaped section (18, 18'), and followed by at least a fifth axial section (19, 19') which merges into a transversely extending second insertion section (20, 20').

5. The actuating apparatus according to claim 4, wherein each of the second and the fourth helically shaped sections (15, 15'; 18, 18') has a length and a gradient that is calculated such that the actuator module (1), during the insertion of the coupling element along each of the second and the fourth helically shaped sections (15, 15'; 18, 18'), performs a rotation of 90°.

6. The actuating apparatus according to claim 4, wherein the first insertion section (17, 17') has a substantially funnel shaped style and the second insertion section (20, 20') has a substantially funnel shaped style.

7. The actuating apparatus according to claim 1, wherein several assembly guides are provided over a circumference of the enclosure (3) of the actuator module (1) and are offset from one another.

8. The actuating apparatus according to claim 7, wherein two assembly guides are positioned at an angle of substantially 180° with respect to one another.

9. The actuating apparatus according to claim 7, wherein each of the insertion sections (17, 17'; 20, 20') in each of the several assembly guides merge into an area of motion (23, 23'; 24, 24') of an accommodation area (8, 8'; 9, 9') of the actuator (4, 5), and each of the areas of motion (23, 23'; 24, 24') is provided by a recess in the enclosure (3) of the actuator module (1).

10. The actuating apparatus according to claim 9, wherein an extraction section (25, 25'; 26, 26') is assigned to each of the areas of motion (23, 23'; 24, 24') of each of the accommodation areas (6, 7), on a side opposite to the insertion section (17, 17'; 20, 20'), to disengage the operational connection between the coupling element (10; 11, 11') and the spindle nut (6, 7).

11. The actuating apparatus according to claim 1, wherein the actuating apparatus is used in an automotive double clutch transmission with at least one layshaft (w_v1, w_v2) for an inner activation of at least one shifting mechanism.

12. An automotive double clutch transmission shift mechanism actuating apparatus for actuating at least one shift mechanism of a transmission for shifting at least one gear wheel on a hollow shaft (2), the double clutch transmission shift mechanism actuating apparatus comprising;
   a hollow shaft (2);
   at least one gear wheel mounted on the hollow shaft;
   at least one actuator module (1) at least partially positioned in the hollow shaft (2) and which comprises at least two actuators (4, 5);
   the at least two actuators (4, 5) being at least partially positioned in the hollow shaft (2) and the at least two actuators (4, 5) each enabling internal axial actuation of and each being operationally connectable with a respective coupling element (10, 11, 11'), the respective coupling element (10, 11, 11') moving in an axial direction relative to the hollow shaft (2) upon axial actuation;
   each coupling element (10, 11, 11') extending radially inward to an inner diameter of the hollow shaft (2); and
   the actuator module (1) having at least two axial assembly guides as open passageways for the respective coupling elements (10, 11, 11') when the actuator module (1) is axially inserted into the hollow shaft (2).

* * * * *